United States Patent [19]

Lupien et al.

[11] Patent Number: 5,101,353
[45] Date of Patent: Mar. 31, 1992

[54] AUTOMATED SYSTEM FOR PROVIDING LIQUIDITY TO SECURITIES MARKETS

[75] Inventors: William A. Lupien, La Canada, Flintridge, Calif.; John P. McCormack, West Boxford; H. E. C. Schulman, Boston, both of Mass.

[73] Assignee: Lattice Investments, Inc., Cambridge, Mass.

[21] Appl. No.: 358,873

[22] Filed: May 31, 1989

[51] Int. Cl.[5] .................... G06F 15/20; H04Q 00/00
[52] U.S. Cl. ........................ 364/408; 340/825.26; 340/825.27
[58] Field of Search ............... 364/408; 340/825.26, 340/825.27

[56] References Cited

U.S. PATENT DOCUMENTS

| | | | |
|---|---|---|---|
| 4,334,270 | 6/1982 | Towers | 364/300 |
| 4,412,287 | 10/1983 | Braddock, III | 364/408 |
| 4,674,044 | 6/1987 | Kalmus et al. | 364/408 |
| 4,677,552 | 6/1987 | Sibley, Jr. | 364/408 |
| 4,694,397 | 9/1987 | Grant et al. | 364/408 |
| 4,751,640 | 6/1988 | Lucas et al. | 364/408 |
| 4,903,201 | 2/1990 | Wagner | 324/408 |

OTHER PUBLICATIONS

Expert Systems in Finance Planning; May 1988, vol. 5, No. 2; B. Humpert Constraint Logic Programming and Option Trading; Catherine Lasser; Ken McAloon; IEEE Expert 1987.

Primary Examiner—Dale M. Shaw
Assistant Examiner—Xuong M. Chung
Attorney, Agent, or Firm—Peter E. Rosden

[57] ABSTRACT

An automated system for managing one or more large investor portfolios containing both cash and numerous, diversified securities in a real time environment provides added liquidity to the securities markets while maintaining predetermined portfolio objectives for each portfolio. The disclosed system uses data processing equipment to place buy and sell orders on securities markets and with automated brokers to execute trade directly between users of the system and external markets. Holders of such large, diversified portfolios have usually been long-term investors. The system allows active market participation by such investors whereby they provide added liquidity and depth to the securities markets while overcoming problems caused by trader identification and the inability to enter, change or execute orders in a real time environment. The system monitors and analyzes a variety of factors which effect trading decisions in a vast number of securities. Such factors include other security trades, price and size quotations and financial ratios for particular securities. This information is further analyzed in relationship to each investor portfolio using the system to determine what transactions might benefit the portfolio by seeking to provide an incremental return while accommodating the basic portfolio objectives. These objectives may be changed at the election of the investor at any time. Orders representing such transactions are entered by the system and executed in real time either internally between system users or externally with computerized brokers and/or stock exchanges and markets.

16 Claims, 9 Drawing Sheets

```
Date   10/20/89                    C L I E N T   N A M E              DJI 3,153.75
Time   14:56:01 EST                     EQUITY TRADER                 Change +15.34
Vol    184  (216)                      PENDING TRADES                 Tick   +153
                                  Ranked by Value - Ascending S A L E S                              P U R C H A S E S
SYM  Bid  Ex Ask  Ex Size     Order LIMIT   SYM  Bid  Ex Ask  Ex Size     Order LIMIT
ABC  16.1  * 16.3  *  50x100     50   16.4  XYZ  16.1  * 16.3  M 50x100     50   16.1
DEF  21.   N 21.1  * 600x150    100   22.              substitute BBT cancelled list
G    25.   M 25.2  N 120x 15    100   25.3
HI   20.1  M 20.3  *  20x200    200   20.3
JKL  22.   * 22.1  * 190x300    200   22.4
              substitute H
STU  30.1  P 30.2  *  86x130    300   30.3
VWXZ 10.6  * 10.7  N 685x999   1000   10.7

Scroll up for 2, dn for 12 other orders
Total:  21 orders,                            Total:  1 orders,
55,000 shares, $2,210,000. 78% @ 5.3%         5,000 shares, $ 80,000. 100% @ 1.3%

Sort: Size: nearness to Execution-Right/Wrong side: Mkt move: Symbol: Value:
F1 SYM(Stock Detail): F3 SYM(Cancel Order): F8(Executions): F10(Cancel ALL)
* System Orders         F9 (List of Cancellations)               (C) MJT
```

FIG. 3

```
Date   10/20/89                          C L I E N T   N A M E         DJI  3,153.75
Time   14:56:01 EST                          EQUITY TRADER             Change +15.34
Vol    184    (216)                        CANCELLED TRADES            Tick   +153
                                       Ranked by Value - Ascending S A L E S                                    P U R C H A S E S
SYM  Bid  Ex Ask Ex  Size    Order LIMIT    SYM  Bid  Ex Ask Ex  Size   Order LIMIT
C    16.1  *  16.3  * 50x100    50   16.4   BBT  36.1  *  36.3 M 50x15    10   36.1
F    21.   N  21.1  * 600x150  100   22.                   substitute WGT active list
E    25.   M  25.2  N 120x 15  100   25.3
H    20.1  M  20.3  * 20x200   200   20.3
J    22.   *  22.1  * 190x300  200   22.4
M    10.1  N  10.2  N 55x 30   500   10.3
S    30.1  P  30.2  * 86x130   300   30.3
VXZ  10.6  *  10.7  N 685x999 1000   10.7

Scroll up for 2, dn for 22 other orders
Total: 32 orders,                            Total: 1 orders,
  855,000 shares, $12,210,000.                 1,000 shares, $ 36,125.

Sort: Size: nearness to Execution-Right/Wrong side: Mkt move: Symbol
F1 SYM(Stock Detail):F3 SYM(Cancel):F7(Pending):F8(Executions):F10(Cancel
* System Orders                                                   (C) MJT
```

FIG. 4

```
Date  10/20/89                    C L I E N T   N A M E              DJI 3,153.75
Time  14:56:01 EST                    EQUITY TRADER                  Change +15.34
Vol   184     (216)                    Executions                    Tick   +153
                                 Ranked by Value - Ascending Trade   S A L E S        Size              Trade    B U Y S          Size
SYM     (000) Price Bid  Ask     (000) Cost %   SYM (000) Price Bid  Ask     (000) Cost %
CDA       5.0  16.  16.1  16.3   5x10    3.2    ZYX  10.0  25.2 25.3 25.5    50x 1  -1.3
FED      10.0  21.  21.   21.1  60x15    0.0
H        10.1  25.  25.   25.2  12x 1    0.0
IG       20.0  20.1 20.1  20.3   2x20    0.0
LKJ      20.4  22.1 22.   22.1  19x30   -0.5
ONM      50.7  10   10.1  10.2   5x 3    1.0
RQP      20.0  30.3 30.2  30.4   4x 6   -0.3
UTS      30.0  30.  30.1  30.2   8x13    0.3
ZXWV    100.0  10.7 10.6  10.7  68x99   -0.4

Scroll up for 2, dn for 12 more trades
Total: 23 trades,                                Total: 1 trades,
155,000 shares, $4,190,000: Cost -0.35%          10,000 shares, $252,500: Cost -1.3%
Cost - to Last: from Prev Close: to Current Quote Right/Wrong side:
Sort:Shares: Value: Cost-Prev cls,Last,Bid,Ask: Symbol:Ind: Mkt mve
F1 SYM(Stock Detail):F3 SYM(Cancel Order):F7 (Pending):F10(Cancel ALL):(C) MJT
```

FIG. 5

```
Date   10/20/89                  C L I E N T   N A M E              DJI 3,153.75
Time   14:56:01 EST                 EQUITY TRADER                   Change +15.34
Vol    184   (216)        SYSTEM ORDERS - BEST PERFORMING STOCKS    Tick   +153
                          Ranked by Change from Close - Descending S A L E S                                    P U R C H A S E S
SYM  Bid  Ex Ask  Ex    Size    Order Chnge    SYM  Bid  Ex Ask  Ex    Size    Order Chnge
CBA  16.1  *  16.3  M   50x100   100    +4     CBA  16.1  *  16.3  M   50x100    50    +4
FEA  21.   N  21.1  *  600x150   150    +4     FEA  21.   N  21.1  *  600x150   150   -1  +4
V    25.   M  25.2  N  120x 15   100 +1 +4     BKB  22.   *  22.1  *  190x300   190      +3
IH   20.1  M  20.3  *   20x200   200    +3     BNDS 10.6  *  10.7  N  685x999   685      +2
BKB  22.   *  22.1  *  190x300   300    +3
ACS  29.2  N  29.3  *   10x 50    50    +4
STU  30.1  P  30.2  *   86x130   130    +4
BNDS 10.6  *  10.7  N  685x999  1000 +1 +2

Scroll up for 2, dn for 25 other orders
Total: 35 orders,                              Total: 4 orders,
       755,000 shares, $21,540,000.                   107,500 shares, $ 1,548,000.

To EXECUTE - TYPE your size over Order size, Hold CTRL down & hit TAB
Sort: Size: nearness to Execution-Right/Wrong side: Mkt move: Symbol: Value:
F1 SYM(Stock Detail) :F3 SYM(Cancel Order): F8 (Executions): F10(Cancel ALL)
* System Orders                        F9 (List of Cancellations)
                                                                    (C) MJT
```

FIG. 6

```
Date  10/20/89                  C L I E N T   N A M E              DJI 3,153.75
Time  14:56:01 EST              EQUITY TRADER                      Change +15.34
Vol 184  (216)  Order Form - XYZ Widget Corp of America            Tick  +153

Hi  16.3  Lo 16.1  Open  16.1   System Ask          ORDER - ACTIVE    Beta 1.2
Last 16.3 +.1  Vol 300          would execute       (substitute BBT)
                                100% @ 1.3% cost    Price  Size Val Limit
    Bid   Ask   Size   Value(000)    P/Earn Yld/Div    Buy  16.1   50   80   L
*   16.1  16.3  50x100    80x163     15.3   3.1        Sell        0
*   16.   16.4  100x10   160x16      1.11   0.50       Accnts
N   16.1  16.3  100x100  161x163                       AG0054 16.1  5    8   L
M   16.   16.3  1x15       2x24      P/Bk   P/CF       JI1935 16.1  15  24   L
P   16.   16.3  1x1        2x2       1.4    8.1        MX7564 16.1  15  24   L
                                     11.6   2.01       ON6430 16.1  15  24   L Last   6  10 $16.3 11:34   50 $16.3  Alerts: 10:54
Market 1  $16.2 10:44       1 $16.2          10:05
Trades 10 $16.2 10:05      25 $16.1           9:57

Our Trades:   bght  5,000  $16.3 10:54  #AG0054
in XYZ        bght  2,500  $16.1  9:57  #AG0054
              bght  5,000  $16.1 10/19  #MX7564

F1 + SYM (Stock Detail) - F3(Cancel Order): F5(Submit Order): F10(Cancel ALL)
* System Orders-Scroll within boxes- F7(All Pending): F9(Cnxled List) (C) MJT
```

AUTOMATED SYSTEM FOR PROVIDING LIQUIDITY TO SECURITIES MARKETS

TECHNICAL FIELD

The subject invention generally relates to automated systems for trading securities in financial markets and, more particularly, to apparatus and a method for broadly increasing liquidity and depth in such markets by trading portions of normally dormant portfolios including those with numerous and diverse securities. The invention seeks to accomplish this without substantially increasing the risk of loss to holders of those portfolios by maintaining an approximation of the desired investment mix in those portfolios while reacting to market pressures so as to generate incremental returns to portfolio holders.

BACKGROUND OF THE INVENTION

For many years the institutional holdings of securities have been increasing. Institutions now hold in excess of forty percent of the market value of American equity securities. Investment managers of large portfolios generally believe that it is prudent either to invest assets in core or index portfolios which remain relatively stable or, if actively investing, to do so in a small enough number of securities that they can properly monitor the progress of the companies whose securities they own. If they pursue the second alternative, they may, in many instances, take positions exceeding five percent or more of a corporation's capitalization. Since there are few corporations that have a total turnover of their capitalization greater than two hundred and fifty percent on an annual basis, or an average of one percent per trading day, investment managers find themselves holding positions representing five or more days of trading volume. These are large and unwieldy positions relative to the capital available to those responsible for making markets in these securities. Hence, any order to trade such large positions may either remain unexecuted due to the absence of buyers or sellers large enough to be the contra party or, if execution is forced, may cause large, temporary swings in market prices through the effect of supply and demand forces. Large swings in prices reflect unrealistic market values to the general public and may cause inappropriate or even harmful reactions thereto. Strains are placed on the liquidity and depth of securities markets and instability may result. The absence of just this type of liquidity and depth was identified in the Report of the Presidential Task Force on Market Mechanisms (January 1988), also known as the "Brady Report", as a fundamental cause of the financial market freefall which occurred on Oct. 19, 1987. No automated trader system has specifically addressed these problems in institutionally dominated markets, and some automated systems, such as portfolio insurance, may even have contributed to the problems. A distinction is drawn here between automated traders which are decision makers and automated trading systems which are message switching systems that allow traders to execute orders.

Other potential difficulties also accompany major securities position changes by institutional holders. For example, it is in the interests of the large institution to maintain both anonymity and to not disclose information concerning the total size and price limit on an order when engaging in substantial transactions both to retain privacy and to avoid other traders front-running the order, thus adversely affecting prices received or paid. Identification of trader interest can result simply by allowing an order to remain open and unexecuted for periods of time as may occur during periods when individual specialists and traders try to assemble bids or offers for large orders or even with preexisting automated trading systems where orders remain in the system until actively cancelled.

Another problem is the inability to quickly enter, cancel or alter the desired terms of securities orders in a real-time environment whether using a computer-directed trading system or not. This difficulty has further exacerbated liquidity problems in the securities markets and has, consequently, made many users reluctant to use automated trading systems. It has also meant that large institutional investors have not had the opportunity to increase the return on their investments through short term trading. Most of their portfolio remains static and/or idle over substantial periods of time, especially when compared to the equivalent value of securities held by individuals of which a portion is continually coming to the marketplace due to the fact that there are many individual decision makers. Institutions, because of their size, reflect an aggregation of the holdings of many individuals subject to the authority of relatively few decision makers. The flow of any particular security to the marketplace from the "institutional market/sector" tends to gyrate widely when compared with the flow of that same security from the "individual market/sector", especially since institutions often react to similar kinds of stimulae, such as research, newsletters and other information services, in making market decisions and, consequently, place disproportionately sized orders at any given time.

The existence of problems such as those discussed above has hindered the development of effective automated trading systems and has caused trading volume by users of such systems to remain relatively low. As a result, such systems often remain under-utilized and, in some cases, have had to cease operations altogether. Although a number of patents, such as U.S. Pat. Nos. 3,573,747 to Adams et al., 4,334,270 to Towers, 4,412,287 to Braddock III, 4,554,418 to Toy, 4,556,066 to Towers, 4,674,044 to Kalmus et al., and 4,751,640 to Lucas et al., disclose automated systems useful in trading and valuing securities portfolios, none of these patents recognize or solve all of the problems outlined above. What is needed is an automatic system for trading securities held by institutions which constantly and anonymously provides depth and liquidity to the market by presenting a flow of buy and sell orders in a wide variety of securities in a real time environment without significant changes in the pattern of returns generated by the securities utilized in the original portfolio in a manner that seeks to provide an incremental profit in return.

SUMMARY OF THE INVENTION

The present invention is an automated securities trading and portfolio management system for use by investment managers. The system is designed to increase liquidity in the secondary markets for securities and to generate incremental returns for security portfolios. Although the system of the invention works well with all diversified portfolios, it is particularly beneficial when used with large portfolios including large numbers of securities, such as those maintained by institutional investors. The invention achieves these effects by using a portion of the portfolio's holdings to offer liquidity to the market. The system contains portfolio balancing controls which seek to ensure that the risk and return characteristics of each underlying portfolio are retained throughout the liquidity generating process. The system monitors security trades, price and size quotations and various portfolio characteristics as well as other factors in real time as disclosed herein. In response to this monitoring process the system enters, alters or cancels buy and sell orders and/or sets thereof through its own network, other networks and/or with computerized brokers and/or computerized stock exchanges.

According to the present invention, data concerning a portfolio or set of security holdings resides on computer files. These files include, among other variables, each client's current and "normal" holdings for each security and its identification data, together with estimates of each security's price variability, cash flows, and a number of investment characteristics such as industry and sector exposures, earnings/price and debt/equity ratios, etc. The computer also holds instructions concerning the maximum and minimum cash positions designated by the client and the deviations allowed from the base portfolio's individual sector, industry and security weightings which may also be determined by the client. Through real time analysis of the data, the present invention tracks how close each security, sector, and the overall portfolio is to the limits designated by the client. To the extent that the limits have not been reached, the present invention will issue buy and/or sell orders as a function thereof as well as the security's volatility, current price and recent price history. It will also take into consideration the closeness of the overall cash position to its limits as well as positions, offsetting or otherwise, already achieved in other stocks. The resulting orders will be broadcast to other market participants logged into the computer executing this program, or series of programs, the placed on one or more computerized exchanges, brokerage services, market access networks or displayed through its own network. The division of orders among those sources of executions will be based upon a series of rules including probability of execution and control of pending orders.

In order to take maximum advantage of this invention, any client using it should have a diverse inventory of securities in its portfolio. The average specialist unit makes markets in approximately 25 to 30 securities, whereas, this invention, due to the use of a central processing unit as controller, can follow an essentially unlimited number of securities and, due to direct electronic connections to computerized brokers, computerized exchanges, broker dealers market access networks and its own network, can do so in a real time environment. In addition, the system can execute multiple trades per second which is far in excess of what any individual market trader could achieve. Hence, one aspect of the system of this invention is that it works so fast and assimilates so much information that the need for and the possibility of human intervention by way of approval of each trade made is unnecessary. A significant advantage of the system of this invention is that it functions to provide liquidity and depth to securities markets by making available portions of large diversified securities portfolios to the market in return for a relatively small incremental profit which these portfolios would not otherwise earn. The system of this invention determines, by application of various investment criteria to individual securities, industries and market sectors, when a small profit may be achievable in a short period of time by buying or selling a particular security in a user's portfolio considering competitive purchase and sale orders in the open market place. The potential profit achievable is a function of the particular security's price volatility and trading volume. The risk assumed is that, as compared to the core portfolio, the provision of liquidity results in the over- or under-weighting of securities which may generate opportunity losses. In other words, the portfolio would have been invested in the particular stock regardless. To buy additional shares in one security, offset by a comparable sale in another security, subjects the portfolio to the risk that the over-weighted security will underperform the unaltered core portfolio, while the underweighted security overperforms it. In any two securities this may happen, but if the differences in weightings are spread over many securities, and the net difference is small (i.e., the cash is controlled), the risk is minimized. Overweighted securities which underperform should generally balance overweighted securities which overperform. If that were to happen exactly, the institution achieves the performance of its core portfolio together with the proceeds extracted from other market participants who traded with the institution at the price offered by the institution. Risk borne by the portfolio using this system arises from the variability in performance of the traded portfolio when compared with the untraded portfolio.

As orders are executed, market quotes change or trades occur in the markets, the system which represents the present invention will update market data, portfolio holdings, including cash, and recalculate purchase and sale orders in all relevant securities. A record of all activity is maintained on the system, including all transactions and unexecuted orders. At the end of the trading day, a file of trade advices is transmitted to (or is available for) the broker's clearing agent, as well as the client's custodian banks.

It is a primary objective of this invention to provide previously unavailable liquidity and depth to securities markets.

It is a further objective of this invention to provide an incremental return to holders of broadly diversified portfolios using the system without altering the pattern of returns from the client's original portfolio. This objective is achieved by trading securities which would otherwise remain "idle" in a portfolio in an environment that provides anonymity during trading as well as small changes in overall market exposure through offsetting positions in many individual securities. "Idle" securities are those which are held by an institution in a static core portfolio and which have a low probability at any moment in time of entering the flow of market transactions.

It is yet another objective of this invention to provide an incremental return to users of this system while simultaneously allowing them to select and alter basic investment characteristics of their portfolios. The system selects and executes trades based on an analysis of transactions and the imposition of controls which leave the basic characteristics of the underlying portfolio of securities selected by the investment manager intact.

It is still another objective of this invention to provide a system which permits investment managers to selectively communicate directly with and/or execute trades with other portfolio holders using the system and/or brokers and/or exchanges.

It is yet a further objective of this invention to provide a system for entering, executing and/or cancelling securities purchase and sale orders instantaneously and anonymously in a real time environment.

It is another objective of this invention to capture, as profit, a portion of the impact upon markets of orders entered thereon by other institutional investors. This impact may be large as a result of gaps in competition and inadequate liquidity. The system takes advantage of securities trading at a short-term premium or discount resulting from supply and demand imbalances by trading them and then making offsetting transactions elsewhere in the portfolio. Despite the trading activity, the fundamental investment characteristics of the underlying portfolio remain basically unchanged.

A further objective of this invention is to provide additional depth and liquidity to markets due to the large number of securities held in portfolios which use the system of the invention. The system will operate to rigorously apply portfolio theory to the securities trading process and to evaluate the appropriate prices for purchase or sale orders for a security given its underlying trading characteristics and its recent behavior as well as that of similar securities.

BRIEF DESCRIPTION OF THE DRAWINGS

The foregoing and other objects, aspects and advantages of the invention will be better understood from the following detailed description of the invention with reference to the drawings, in which.

DESCRIPTION OF THE PREFERRED EMBODIMENT

Figure 1:
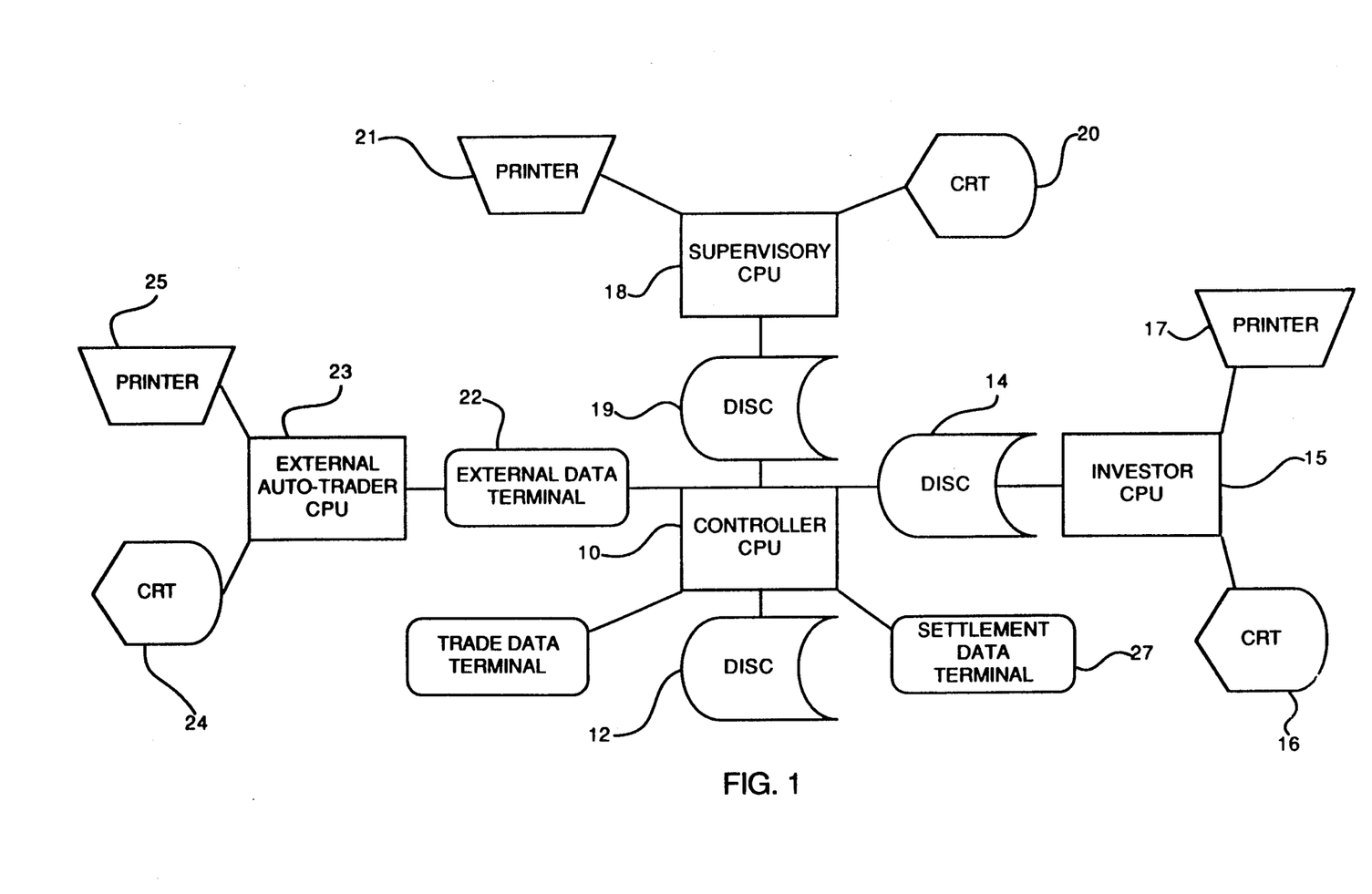
FIG. 1 is a block diagram of the hardware for carrying out the data processing and operational methodology of the securities liquidity provision system of the present invention.

For a more detailed understanding of the invention, reference is first made to FIG. 1 of the drawings. This figure illustrates in block form an overview of an arrangement for implementing the system of the instant invention. The heart of the system is controller central processing unit (CPU) 10 which may be any type of digital computing apparatus, such as a main frame or mini-computer. The controller CPU executes trades and manages orders and portfolios. It also provides status and transaction reports to system users. It acts partially as an order matching device to bring buyers and sellers together, and it collects and stores data on disc 12 in the form of transaction reports from various securities markets as well as the flow of price quotations made by participants in those markets made available through a service such as a securities information vendor. Disc 12 could be any sort of fast access, mass storage device such as one or more hard discs. The information collected thereon would include data on transactions occurring both internally and externally of the system of this invention. The controller CPU disseminates, or institutional investor clients can request, relevant portions of the collected internal data periodically to separate on-line storage devices 14 for each client which may also be any sort of mass storage device such as a hard disc drive, tape drive or magnetic drum. External market data is available to clients from securities information vendors. These storage devices may be located either at the site of controller CPU 10 or at each client's location. These storage devices hold data on the portfolio(s) of each client along with that client's investment strategy, goals and risk profile. Each client can have its own computer terminal CPU 15 which is connected to storage device 14 and to controller CPU 10 by any of a variety of means, such as direct wire, satellite or telephone connections. These terminals may be any of a wide variety of computers including personal computers, main frames or mini-computers, depending on the needs of each client. The data in storage device 14 may be displayed at each client location on an associated CRT display 16 and/or a hard copy printer 17 in a format determined by controller CPU 10 or the client's CPU 15. Algorithms operating either at each client CPU 15 or at controller CPU 10 and customized for each client function to analyze the data in storage device 14 so as to create buy and sell orders for that client. Alternatively, each client may develop its own algorithms to perform the transaction decision-making function and may use this invention only for its trading, order management and reporting facilities, discussed below.

Controller CPU 10 also transmits internal order, quote and transaction data to supervisory CPU 18 through storage device 19 which may be any sort of mass storage device, such as a hard disc drive, tape drive or magnetic drum. External data is available to storage device 19 through securities information vendors. This data is available for display on an associated CRT display 20 and/or a hard copy printer 21. Supervisory CPU 18 monitors selective aspects of the invention through time, handles queries concerning particular orders, executions, cancellations or system statistics, allows intervention if needed and displays and alerts the human operator to unresolved cancellations of executions.

Controller CPU 10 is further connected with the CPU'S 23 of external automated brokers, exchanges and markets such as INSTINET and the CINCINNATI Stock Exchange and others also for purposes of transmitting order and transaction data which may be displayed at these external locations on associated CRT displays 24 and/or a hard copy printer 25. CPU 23 provides client users of the system an opportunity to execute sales and purchases external to the system rather than limiting them to transactions with other clients. The function of these automated brokers and exchanges within the system is explained more fully below.

Within a specified period of a transaction, all executed transactions internal to the system are reported as output through the registered broker/dealer operating the system to a trade data terminal 26 and then to the central reporting facility. Similarly, but only at the end of each trading day, all trades involving each individual security are aggregated, average-priced where appropriate and electronically reported through settlement data terminal 27 for trade settlement to the clearing agent.

Clients and brokers using the system have the ability to view information pertaining to all pending orders and all of their own executed and cancelled orders ranked by various criteria as demonstrated in the various screen or window formats shown in FIGS. 2 through 6. A sorting function allows the user to concentrate on the most important orders according to the selected criteria. This display function allows users to manage their orders and to review how their decision and trade processes are working, how their orders are interacting with the market, and what other market participants are doing.

General market information, supplied by a securities information vendor at the client's site, is contained in the top box of all screens illustrated in FIGS. 2 through 6. Date, time and the day's market volume is displayed on the left hand side, the level and change in one of the broad market indices is placed on the right-hand side along with the tick figure. Tick is the net number of trades that occurred last on a price rise or decline. The middle portion of the top box on all screens displays the client's name, the type of screen being used and the type and kind of sort for the displayed data. All screen segments may be differentiated by color.

The bottom portion of all screens contains prompts that enable the user to change the way the data is displayed or ranked, to move to other screens, to alter orders or to respond to the orders of other system or market participants. To accept instructions, the system makes use of function keys available on most keyboards and on the position of the cursor to highlight the desired function or sorting attribute.

Figure 2:
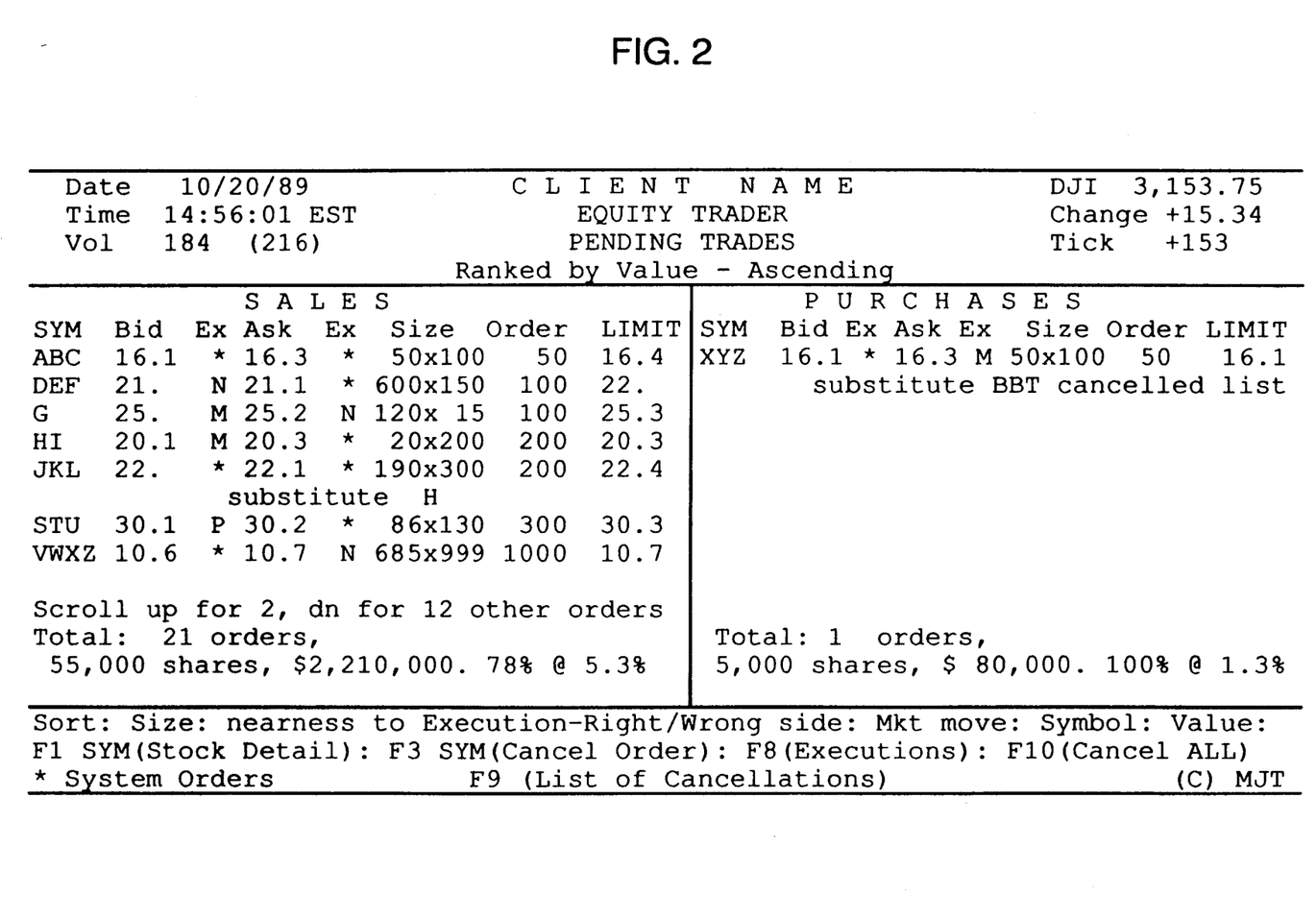
FIG. 2 is a reproduction of data shown on a display screen relating to all orders pending on a particular day for a particular client using the system.

FIG. 2 illustrates a screen displaying all pending orders for an individual user. Clients can view their orders ranked by size (as displayed), nearness to execution, price move for the day, symbol, etc. The screen is divided so that Sales appear on one half of the screen, Purchases on the other. For each order, the security's symbol, best bid, market or exchange displaying that best bid (an '*' means the best bid resides on the system represented by the current invention), similar information for the ask price, the multiple of 100 shares represented by the best bid and ask, the size of this client's order in multiples of 100 shares and the current limit price associated with this order.

The one order listed on the Purchase side of the screen in FIG. 2 indicates that this client has an order to buy 5,000 shares of the security represented by the symbol XYZ at a limit price of $16.125 (all prices are displayed as whole dollars plus the numerates of the appropriate fraction). The best bid for the stock is $16.125 for 5,000 shares. That bid resides on the system represented by this invention, and is obviously this order. The best offer happens to be on the Midwest Stock Exchange, it is for 10,000 shares at a price of $16.375. The client had a substitute order for the security BBT which currently resides on the Cancelled order list. A substitute order is an order for another security, the purchase or sale of which would substantially equally satisfy the objectives of the portfolio. At the bottom of this section, the system totals the number of pending live Purchase orders, the number of shares and the dollar value represented by these orders and what percentage of these orders could be done and at what cost, as measured from the client's limit price, should the client not insist on the displayed limit price, but accept the best terms offered by the other side. In this case, if the client were to go to the Midwest Exchange and pay $16.375, he could, subject to prior sale, purchase his 5,000 shares from the 10,000 offered. The cost represents a 1.3% premium compared to the limit bid of $16.125 which the client is currently advertising.

Figure 3:
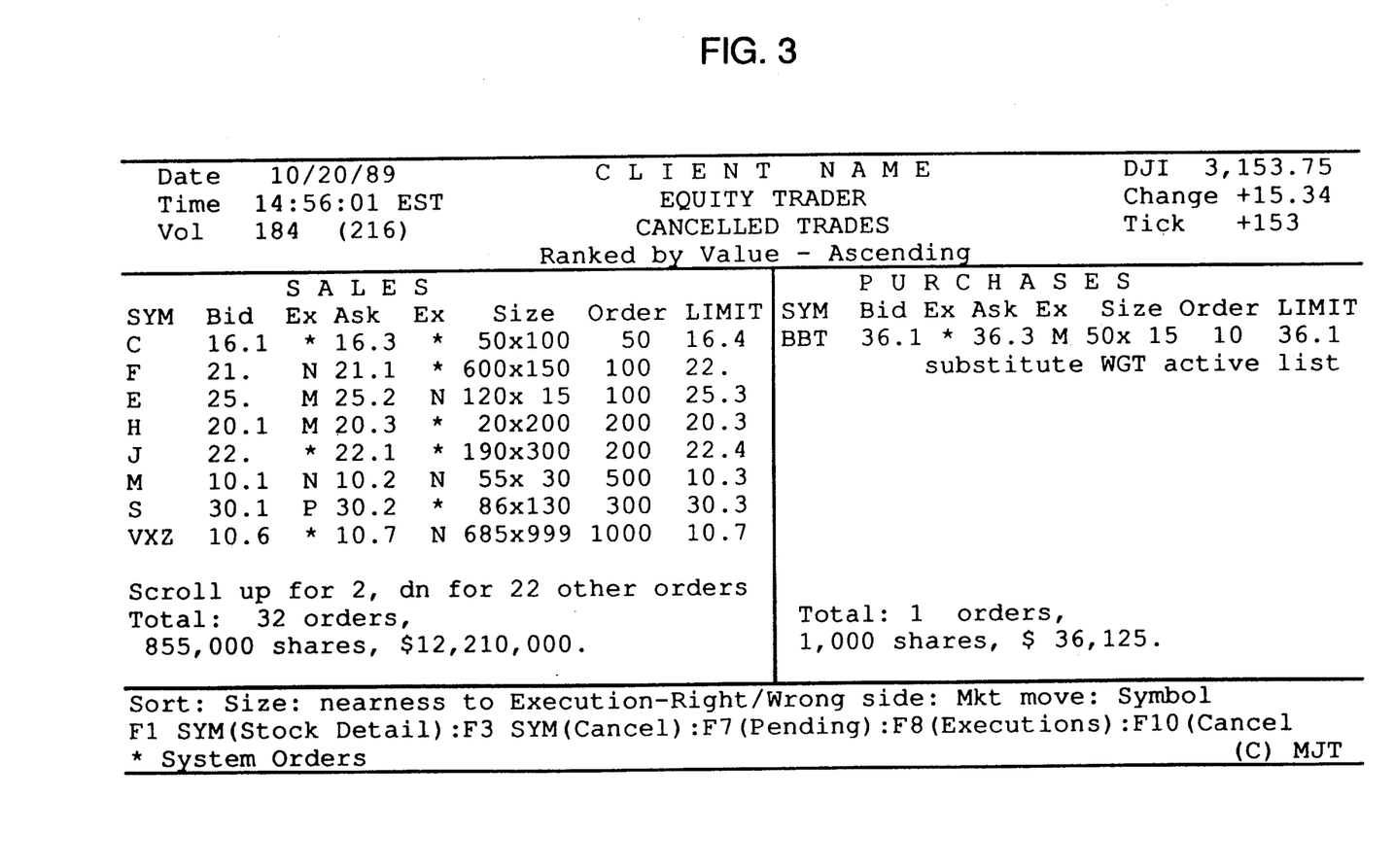
FIG. 3 is a reproduction of data shown on a display screen relating to all trades cancelled on a particular day by a particular client or his trading process.

FIG. 3 illustrates the same information as FIG. 2 but for all trades cancelled on a particular day by the particular client or his trading process.

Figure 4:
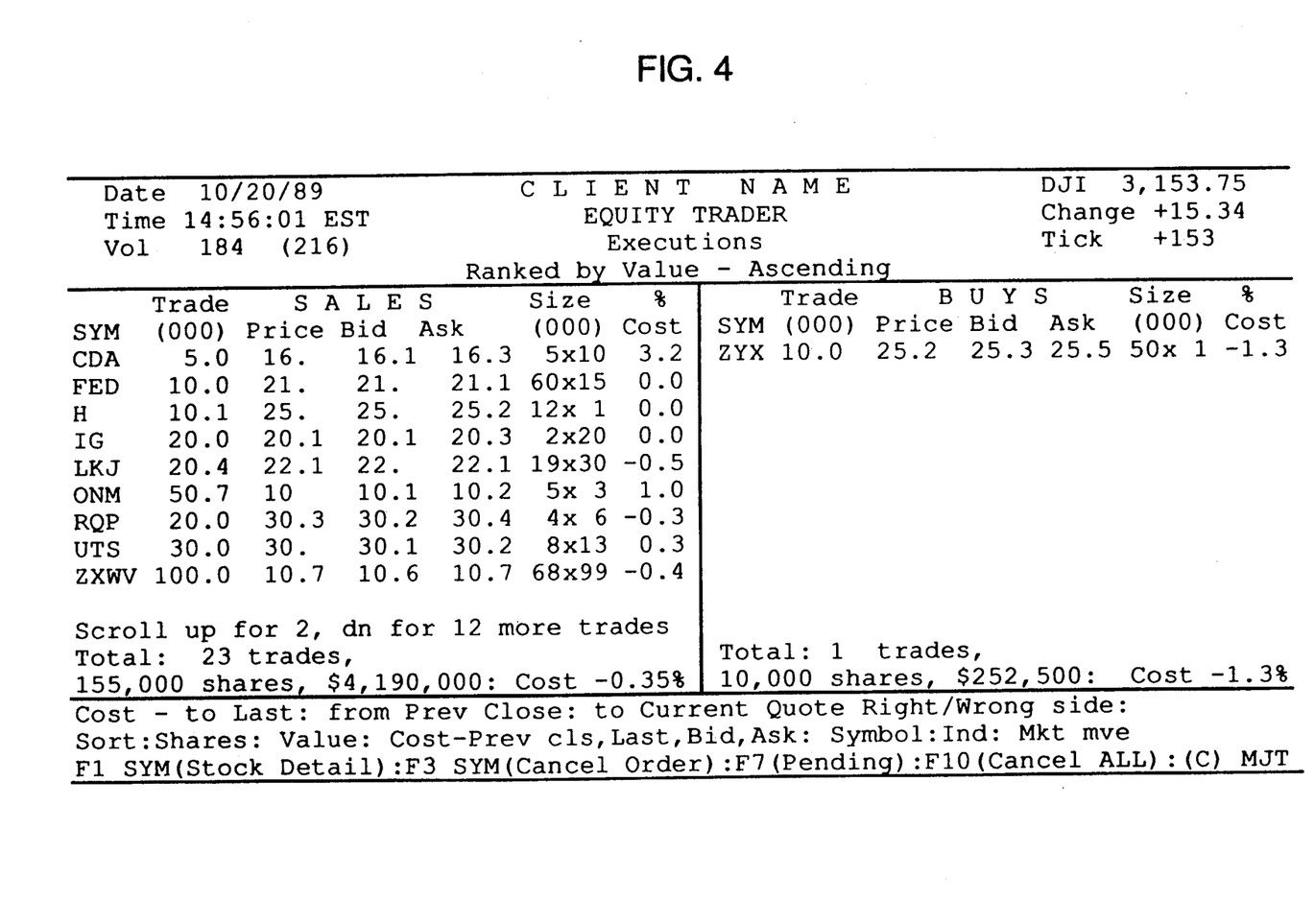
FIG. 4 is a reproduction of data shown on a display screen relating to orders executed for a specific client on a specified day using the system.

FIG. 4 illustrates essentially similar data but, in this case, relates to orders executed on a specified day. The buy side of the screen shows that this client has purchased 10,000 shares of the security ZYX at a price of $25.25. The current bid is $25.375 for 5,000 shares, the ask price is $25.625 for 100 shares and the cost, as measured from the execution price of $25.25 to the current ask (what a purchaser would have to pay currently) is a negative cost (i.e., a profit) of 1.3%. Again there is summary information at the bottom of this segment of the screen.

Figure 5:
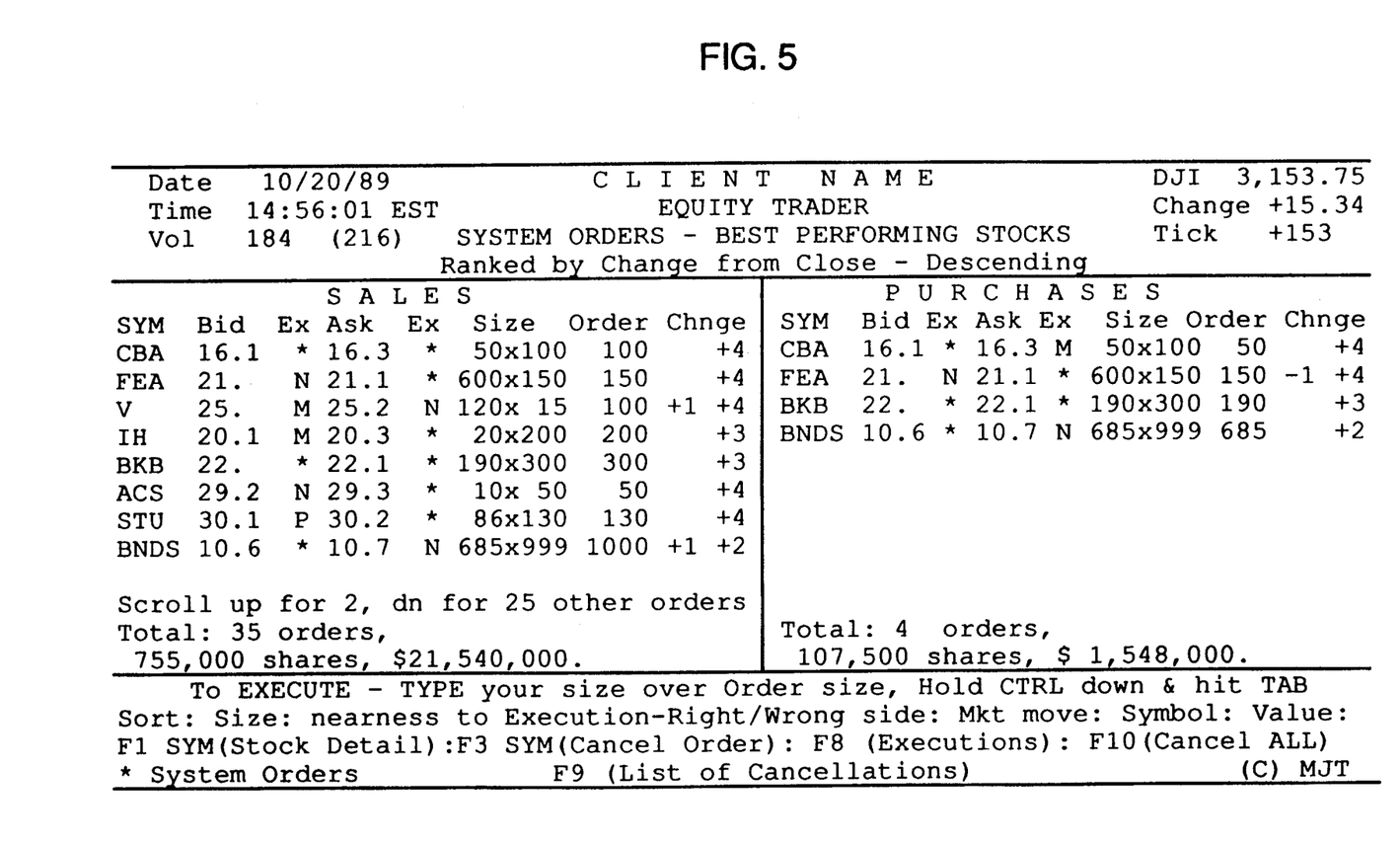
FIG. 5 is a reproduction of data shown on a display screen relating to all orders in the system.

FIG. 5 illustrates similar data for all orders on the system. In this case, the securities are ranked by move from the previous night's closing prices. A security symbol, bid, market, ask, market, size of the bid and ask, the size of the order residing on the system and the change for the day in percent terms are all displayed. Between the size of the order on the system and the percent change for the day is the measurement in eighths from the best ask for sales, bid for purchases, and the limit price for the order on the system represented by this invention. For instance, the system has an order to purchase 15,000 shares of FEA which is up 4% from the previous night's close. The best bid is $21 on the New York Stock Exchange, according to the client's securities information vendor. The system order has a price of $20.875 attached to it, so the screen displays a '−1' in the space between the order size and percent move to inform the user that the system order is the best available price less one eighth.

Figure 6:
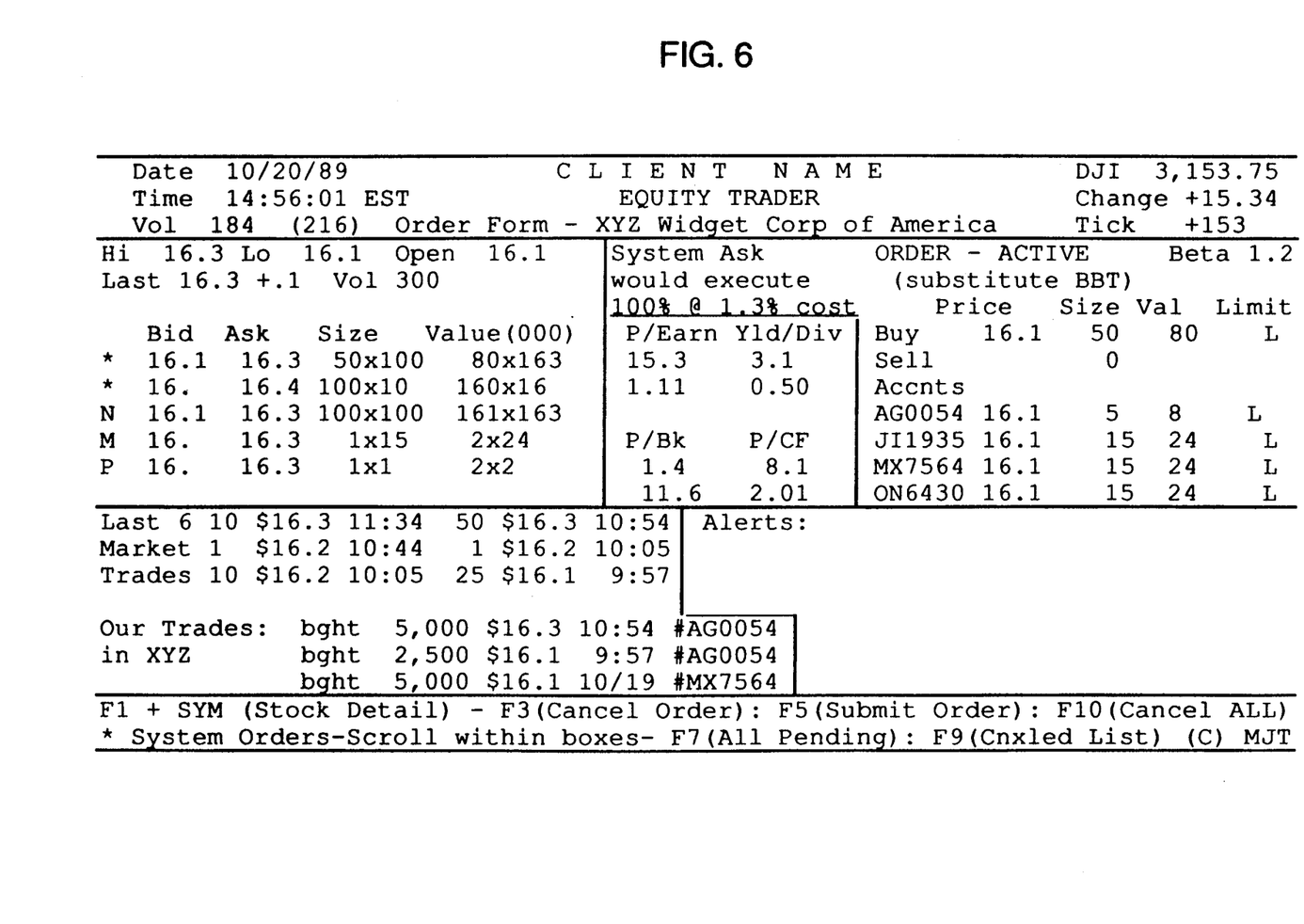
FIG. 6 is a reproduction of data shown on a display screen relevant to a single order placed using the system.

FIG. 6 illustrates information displayed on a screen relevant to a single order. The top left hand side of the working section of the screen gives the high, low, open and last trade prices for this security, along with its change for the day (up an eighth, previous close to last sale) and volume. Shown below are the best and next best bid and ask residing on the system, and the best bids and offers represented by the other markets and exchanges as reported by the client's securities information vendor. Below this section is a segment of the screen which contains information on past trades. The top portion of this screen segment contains shares, price and time for the last 6 market trades in this security obtained from the client's securities information vendor, and below that are listed the client's trades in this security, giving action, size, price, time or date and client account involved in the trade. To the extent that the data resides on the client's computer and is accessible by the current invention, the user can scroll up and down through this historical information. To the right of this screen segment there is room for system or market alert messages.

In the middle of the screen of FIG. 6, the system supplies price sensitive information concerning this security. All basic information is obtained from the client's data base vendor who supplies data on companies' historical income and balance sheets as well as expected earnings. Reported here are the per share earnings and price/earnings ratio ($1.11 and 15.3, respectively), yield and per share dividend, price/book ratio and book value as well as the price/cash flow ratio and per share cash flow data.

The final section of the screen of FIG. 6 contains information about the client's order for this security—WGT—which is currently on the system. As shown, the order is Active (as opposed to Cancelled), the security has a beta of 1.2 (relationship with the market that states that this security moves 20% faster than the market), and has the security BBT as a substitute order. Currently, the client is bidding for 5,000 shares at a price of $16.125. The value of the order is for $80,000 and the order is a limit order. Other ways of limiting the price paid would be a market or industry beta-adjusted order, or a price which floated as a function of the bid or ask price. Below this the same information appears for all accounts that are participating in this order. To the left of the overall order information, the system notes that the Ask price on the system would execute 100% of this order at a cost of 1.3% from the present limit price.

Figure 7:
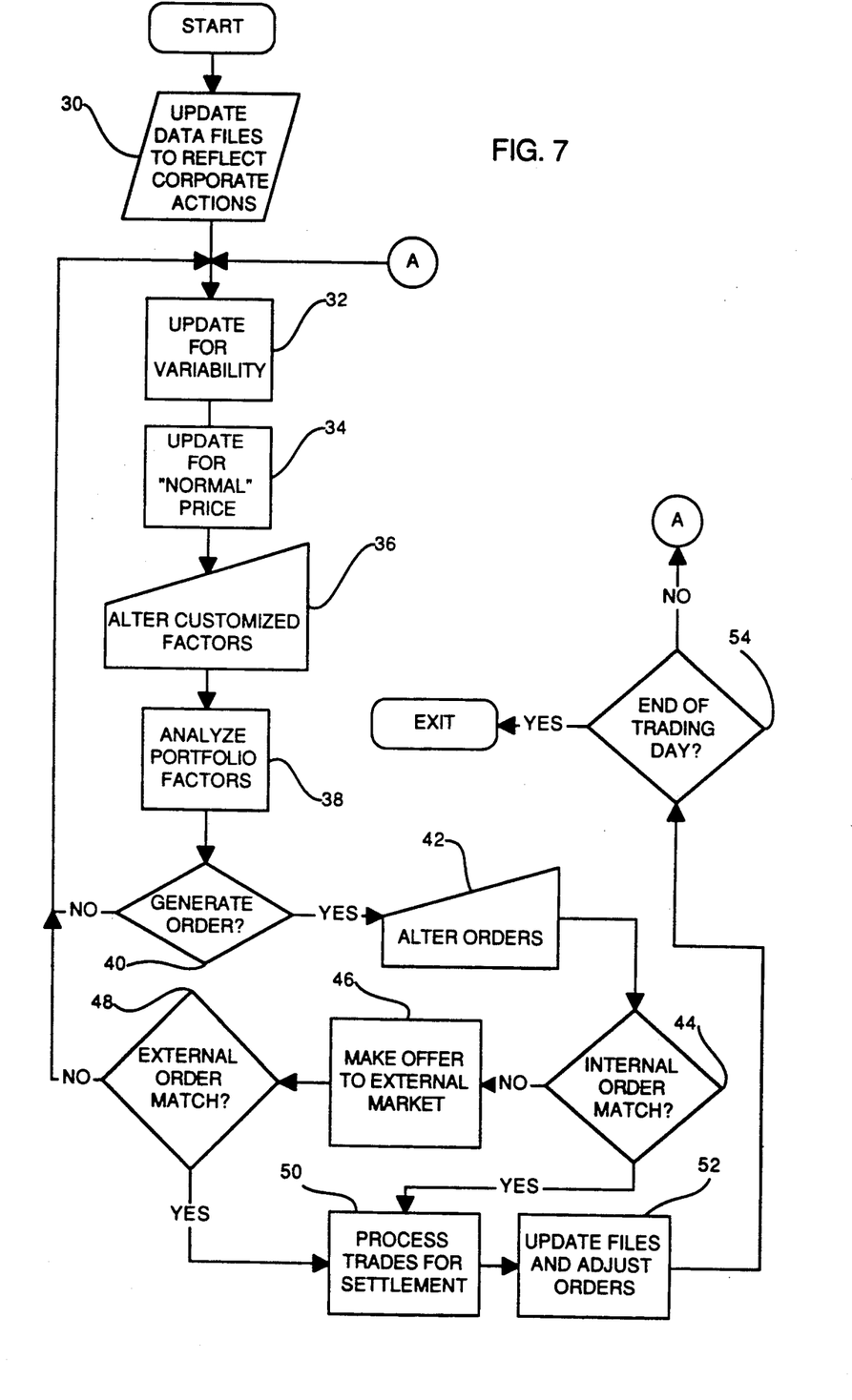
FIG. 7 is a schematic flowchart depicting the data processing, storage and operational steps of the invention for an internal user of the system.

The functioning and interrelationship of the elements of the system shown in FIG. 1 will be further explained by reference to the data storage and processing steps for an individual internal client as illustrated in the flow chart of FIG. 7. For the purposes of this discussion of the functioning of the invention, its operating during a typical single trading day will be used. FIG. 7 shows the data processing and operational steps which occur during such a day as regards an internal user of the system. Before the start of each trading day controller CPU 10 updates its data files at input step 30 with data from disc 12 covering relevant securities market information on corporate actions, such as recapitalizations, stock splits, dividends or interest payments, and closing prices from the previous day. During the trading day it updates its files from storage devices 14 and/or discs 12 with data covering internal market quotes, executions and other internal data, as well as with data continuously input during the trading day from the client's securities information vendor's quote and trade data feeds covering current external quotes, trades and other market data. Using this information, each security in the total inventory of securities covered by the system is updated in step 32 for variability which, in this case, means for the standard deviation or variance of its price fluctuations. Another adjustment is then made in step 34 to reflect the "normal" price of each security in the inventory of securities covered by the system. Normal price is an estimate made of a security's current price and is calculated as an exponentially weighted average of recent trades and/or quotations adjusted for overall market movement. It differs from current market price as a function of trading activity in the security which pushes the current price to one side or another of its normal price.

Since clients have differing risk profiles at different times, the present invention provides added flexibility by permitting the client or manager to make manual changes or changes by electronic means in step 36 to his original criteria covering risk profile and the tolerated variance from the base portfolio by sector, industry, cash and other factors. Such changes may be entered at any time during or after the trading day.

Using all of the resulting data, in step 38 each security is analyzed with respect to the customized criteria established for each individual client based on the following factors:

(1) Variability;
(2) Current holdings of that security in the particular portfolio against the portfolio's base position in that and related securities;
(3) quoted bids and offers;
(4) the cash position of the portfolio;
(5) the exposure of the portfolio to various industries and sectors; and
(6) purchase and/or sale orders displayed by others in automated brokerage or exchanges to which the present invention is linked.

The resultant analysis will be used in step 40 to generate buy and sell orders and/or sets of orders at specific prices for transmission by the system both internally to other clients and externally to outside broker dealers, exchanges and/or others for each security in the client's portfolio as to which the present invention deems it appropriate. The price of purchases and sales is dependent on interrelationships between inventory in the portfolio, the "normal" price for that security and its actual market price at the time the decision is made. The size of the purchase orders generated by the invention is greater the further the current actual price is below that security's "normal" price. The size of the purchase orders, if any, is smaller the further the actual price is above the security's "normal" price. Also, the buying limit, or size of order, per security becomes more (less) stringent as other securities become more (less) attractive to hold or as that security's sector becomes over- (under-) invested or as cash reserves fall (rise) from normal. The size of the sale order generated by the present invention is greater the further the current actual price is above that security's "normal" price. The size of the sale order, if any, will be smaller the further the actual price is below the security's "normal" price. Thus, the selling limit or size of order per security becomes more (less) stringent as other securities become less (more) attractive to hold or as that security's sector becomes under (over) invested or as cash reserves rise (fall) from normal. The size of the buy or sell order can be limited for low price stocks and will be smaller for each difference between the current and "normal" prices the greater a security's variability. Further, the size of the invention's buy or sell order will be larger if such a transition would help to offset a current position imbalance in the portfolio's stock, industry, sector or cash exposure. To the extent that an acceptance of the invention's buy or sell order will aggravate a current imbalance, the size of that order will be restricted. If a decision is made in step 40 to enter no order, control of the program is transferred back to block 32 for analysis to proceed on the next security in the portfolio. It should be understood that the analysis of individual securities in individual portfolios is an ongoing, continuous process wherein the controller CPU 10 causes alterations of bids and offers in direct relationship to changes in the portfolio criteria and the receipt of continously updated current market data from reading quote and trade tapes made available through trade data terminal 26. While this process is described as a flow, the system is "event driven" in that an event such as a transaction for clients or an "out of pattern" action by other market participants elsewhere will interrupt the flow and trigger a response on the part of this invention's trading and balancing algorithms. This response will be based on the rules discussed above.

A particular advantage of this invention is that clients running their own balancing algorithms may in step 42 alter any order on the system by changing, cancelling or adding to it. What differentiates this capability, as implemented by this invention, from others that allow the keyboard or computerized entry of orders into computerized securities trading systems is that the system of the invention allows computers to alter and receive confirmation of order changes on national markets with a delay of only seconds. For orders that have been placed outside of the system due to direct connection with automated brokers and/or exchanges, such as INSTINET and the CINCINNATI Stock Exchange, through external data terminal 22, the speed of the cancellation or altering process depends on the response time of these other computers. By comparison, orders placed on other electronic order routing systems, such as the Designated Order Turnaround (DOT) system of the New York Stock Exchange, for example, although entered by computer, still generally depend for execution on human specialists or traders who must ultimately react to the order. Hence, undesirable and unexpected delays are inherent. This invention substantially removes such problems. Manual alteration of orders, although not usual due to the speed of operation of the system and the reliance on trading algorithms, is also available to clients at step 42.

That portion of the invention that receives, handles and executes orders for the purchase and sale of securities and reports transactions to the central reporting facility, if appropriate, and to the clearing agent is operated by a registered broker/dealer. That portion of the invention which analyzes price and determines orders is operated by a registered investment adviser. Orders are executed by the system on a price/time priority basis within the system in step 44, although orders could also be executed on a price/size/time priority basis. All orders generated are forwarded to controller CPU 10 which presents them together with those from other clients for display to each client or client process in a manner discribed below. If a purchase order matches a sale order (in whole or in part) created for another client portfolio the controller will match the two and a trade will occur which will be reported to the markets as well as to each client's portfolio trading algorithm. If orders are not executed within the system, control passes to block 46 where controller CPU 10 decides, based on recent trading history, where and how much of each order to place on which external automated market, broker, exchange and/or its own network. Orders placed other than on its own network are submitted on a price/probability of execution basis. Further, if an order has been published to a market, broker or market access network, internally executed transactions between clients are done on a subject to cancellation basis. As long as an order remains unexecuted, it is subject to cancellation or alteration by the system in step 38 or by the client's process or manually in step 42.

In the absence of an external order match control of the program is transferred from block 48 back to block 32 for continuing analysis. The order matching procedure of steps 44, 46 and 48 is discussed in further detail below with regard to FIG. 8.

If a trade is executed internally in step 44 or externally in step 48, control is transferred to block 50 which governs settlement procedures. All internal trades executed for clients by the present invention are immediately reported in the appropriate manner to the central reporting facility via trade data link or terminal 26 so as to disclose them to the markets and are written to files in the storage devices 14 of each client for processing at the end of each day. They can be viewed selectively based upon various levels of secure access during the trading day. At the end of the day, all purchase and sale transactions for each portfolio in each security are average-priced at the client's instruction so that there is only one sale report and one buy report per security per client. These reports are then forwarded to the clearing agent and, if appropriate, to each client's custodian. Internal reports for record-keeping and research purposes are also made. Further detail concerning settlement procedures is provided in connection with the discussion of FIG. 9 below.

As the trading day progresses, the system updates its trade and quotation files according to steps 30 and 52 and then returns to step 32 to make additions, alterations or cancellations of buy and sell orders according to the succeeding steps as explained above. Securities which are not performing according to their historical norms are flagged for special analysis by the system. As trades are executed for each client's account, the relevant portfolio's holdings are updated in real time along with industry and sector weightings, cash exposure and the profit or loss and commission statistics. Similarly, variability and "normal" prices are also adjusted. The present invention's speed in issuing or updating orders in response to changes in quotations made by other market participants will be a function of the current position of the portfolio versus its guidelines and its recent trading activity. The further away from its base position or the less its recent trading activity, the slower will be the invention's adjustment by means of new or changed orders to price quotations of which the resulting trades will be more stabilizing or profitable to the client, and the faster will be its response to other price quotations.

If the trading day has not ended, step 52 requires return to step 32 to allow factors effecting future trading to be reassessed and new trading decisions to be implemented. If the trading day has ended, the program is exited.

Figure 8:
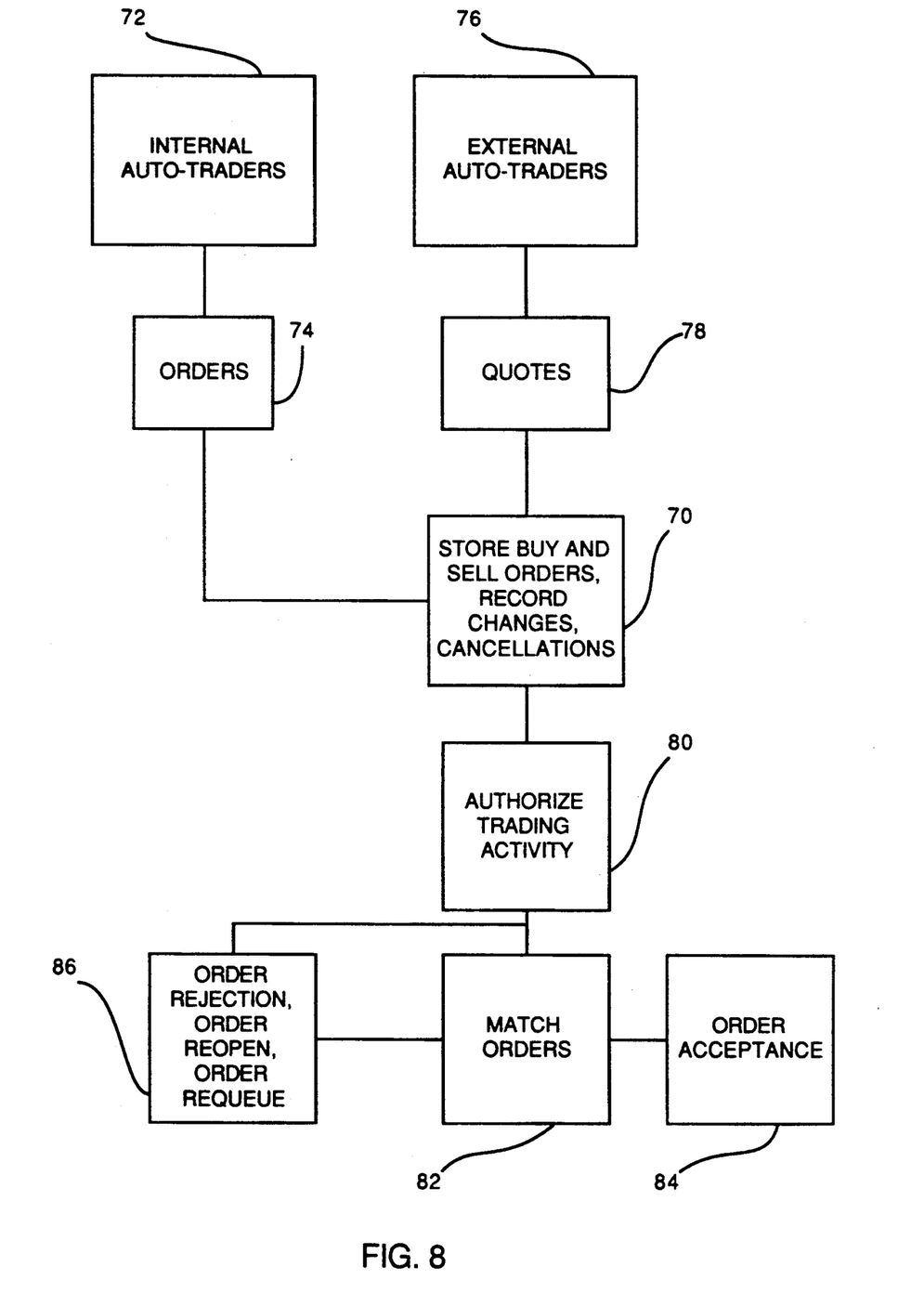
FIG. 8 is a block diagram illustrating the order matching process as it relates to internal and external users of the system of this invention.

Reference is now made to FIG. 8 for an illustrative overview in block diagram form of the means by which controller CPU 10 interacts with internal and external participants using the system of this invention for purposes of order matching. This process was referred to above in flow diagram steps 44, 46 and 48. An order is an instruction to buy or esll a security at a certain price or better. Orders may be any of the types commonly known such as market, limit, fill or kill, etc. Users of this system place orders with controller CPU 10 which in block 70 stores and maintains a list, referred to in the industry as a "book", of such orders ranked by price, source (internal or external of the system), size and time of order. Users may either be internal auto-traders (the customized client process described above) or external auto-traders (automated exchanges or brokers). An auto-trader is a computer process which enters orders directly with the system at block 70. Auto-traders represent their security orders directly to each other through block 70 for potential execution. Internal auto-traders 72 are processes or internal clients which do not have to communicate outside of the system of the invention to execute a trade or to place or change an order 74 with controller CPU 10, whereas, external auto-traders 76 must complete their trading transaction outside of the system of the invention, making their orders on the invention subject to cancellation. Examples of external auto-traders include the INSTINET and CINCINNATI Stock Exchange automated trading systems. Orders are placed by external auto-traders at the highest bid and lowest offer which they have outstanding on their own "books" and which, when supplied to controlleer CPT 10 at block 70, automatically become treated as orders. These orders are cancelled and replaced when the quote changes. An authorization list 80, stored and enforced by controller CPU 10, defines which subset of users may trade with each auto-trader. For instance, the system might prohibit trading between selected clients.

The system of this invention matches orders in block 82 on a price-time priority basis. A match occurs when a buy order and a sell order agree on security name, price, size and terms of the trade. If a match is detected, both the buy and sell sides of the order are at block 84. In the case of external auto-traders, acceptance is tentative and becomes final only when confirmation from the external auto-trader is received by the system. Since external auto-traders must themselves confirm a match there will be a limited period of time before acceptance or rejection, and, therefore, the tentative acceptance procedure is necessary. By contrast, internal auto-traders accept matches immediately in real time without tentative acceptance. If either side of the trade rejects the match, the order is reopened at block 86 while the order of the rejecting side is newly time-stamped and moved to the rear of its price-priority group. The order of the accepting side is not requeued.

External auto-traders can be rated by order throughput, i.e. by volume of orders executed. An external auto-trader producing three times the execution volume could be given three times the order flow from the order handling process when quotes are indentical. Order placement will be biased by the relative sizes of the best bid and/or offer of different external auto-traders. The invention will move orders to the auto-trader which has matching side size relative to other external auto-traders and order size will move away from the auto-trader which has same side size relative to other external auto-traders. The system could recognize volume of orders executed or quote size varying time horizons which could allow it to indicate the presence of the other side in a remote system. These additional factors increase throughput and decrease additional costs.

Both internal and external auto-trades may cancel an order or replace it with a new order on different terms. However, cancellation is problematic when an order has been placed with an external auto-trader. The cancellation in this case is accepted subject to prior execution. If the external auto-trader has a defined cancellation mechanism, the cancellation is effected when the external acknowledgement is received. If there is no definite mechanism or too much time elapses, the cancellation is effected by the system's internal rules. An execution report which is subsequently received from the remote system and which cannot be matched will be refused and an alarm transmitted to supervisory CPU 18 for display on CRT 20 and/or hard copy printer 21 for human resolution.

Orders residing on both the present invention and external computerized brokers, exchanges and/or markets are subjet to cancellation due to prior execution in such other systems. If the client desires, an order may be transmitted to such other systems to match against order residing thereon. However, the auto-trader methodology of the invention also provides for other types of special auto-traders which fulfill specific functions. Such special auto-traders resemble "floor brokers" who place orders on remote systems subject to various terms. If it is in the interest of clients using this invention, their auto-traders will ask these special auto-traders to place sell orders at or near the offer, buy orders at or near the bid on a remote system. These orders would then be displayed on that system to the extent that they matched the interests of other system clients. The order manager auto-trader would assign any trades done on the remote system to system clients using a price/time priority basis. Another type of special auto-trader can take any order and pass it through to a remote system. These orders would be represented in addition to those of the right and wrong side auto-traders. This type of special auto-trader could be used by a human trader communicating by terminal to gain unfiltered access to a market.

Trade reports from remote systems would be matched to outstanding tentative executions just as the original orders were matched. Partial order matches or partial executions cause the contra side order to split into an order of the correct size and an order holding the remaining size. Rejection of a match triggers appropriate fusion of previously split orders.

As noted above, an internal auto-trader may issue an order as good or better than an external quote which is in tentative match. The internal quote is matched as soon as the external match is rejected. The match system can recognize that a better match is possible and attempt to cancel the eternal order before it is accepted. In addition, the match process is able to "chain" matches so that all of the matches are done or none are done. This would, for instance, allow an order for a security denominated in currency "a" to be executed in a market trading in currency "b" if the "b" to "a" exchange rate were acceptable. Further, the system could be modified to include an intelligent order manager which executes profitable trades that the base system would not itself execute. For instance, an all-or-nothing order for 16,000 shares of IBM would fail if the system had only 15,000 shares available. The intelligent order manager would, upon the client's standing or contemporaneous instruction, execute the full order and find the other 1000 shares later if the overall trade looked profitable or if customer satisfaction required execution.

Figure 9:
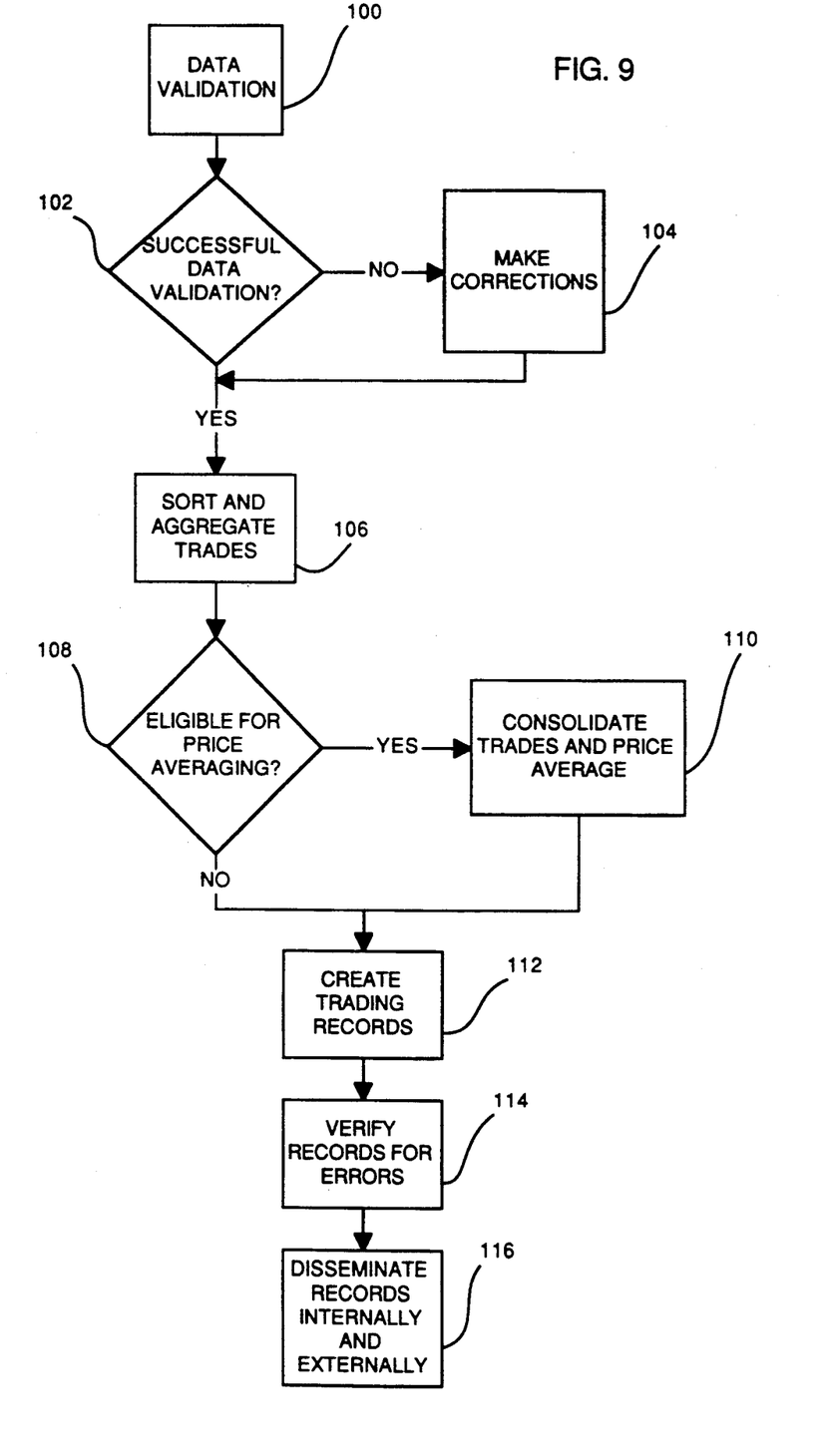
FIG. 9 is a schematic flowchart depicting the data processing storage and operational steps of the invention for processing the settlement of trades.

Reference is now made to FIG. 9 which illustrates in schematic flowchart form the trade settlement procedures used by the present invention to handle order matches at the end of each trading day. This flow chart examines in greater detail the activity undertaken by the system which was referred to above in step 50 of FIG. 7. After an order has been matched and accepted by both sides, controller CPU 10 validates all data concerning the trade in step 100. Proper identification for each security, broker, customer account, exchange code, transaction date, settlement date, price and all other aspects of the trade are checked to ensure accuracy. Validation procedures are flexible enough to allow exception overrides, as well as easy additions and deletions to each data item's possible value list. Validation can best be accomplished using a relational data base language. If validation fails in step 102, control is transferred to step 104 where corrections may be made either by human intervention or, preferably, in an automated fashion through the use of databases. After either successful validation or correction of errors, control passes to step 106 in which the trades are sorted and aggregated by security. Each trade is then tested in step 108 to see if it is eligible for price averaging. Various factors could preclude any particular trade from eligibility. For example, average pricing would rarely be done between clients who both paricipated on the same side of a trade. An important aspect of this invention occurs in step 110 where, at the client's instruction, eligible purchases (sales) in the same security are consolidated and priced on an average basis for each client. This procedure results in one buy and/or one sell order being generated for any particular customer at an average price regardless of the actual number of trades executed to accumulate or sell the shares of that particular security during that day. The advantageous impact of this aspect of the invention becomes apparent when it is understood that the invention is specifically designed to generate large numbers of trades for a given client, possibly in the same security, on any given day. When the average price processing is complete, data concerning both the trades which were average-priced and those which were not, are written into a record-keeping system in step 112, again rechecked for errors in step 114 and then disseminated in step 116 both internally for accounting purposes within the system and externally to a clearing agent and settlement house.

What is claimed is:

1. An on-line interactive investment processing system for providing added liquidity to markets for investment securities and for managing in a real time environment the interaction of one or more large, institutional portfolios of investment securities with each other and with the securities markets, wherein each portfolio has an inventory including numerous and diverse securities and each portfolio has separate portfolio objectives represented by a specified desired mix of investments in securities and cash reserves through generation of trading decisions in the form of buy and sell orders on behalf of each of those portfolios comprising:

first storage means for collecting and storing securities transaction data and price quotation data both from a plurality of securities markets external to the system and from buy and sell orders and transactions generated internal to the system;

controller means for accessing data stored in said first storage means, for analyzing the data stored in said first storage means and for substantially simultaneously transacting multiple buy and sell orders representing a plurality of securities for one or more of the investor portfolios, wherein said controller means presents orders representing such transactions first only internally to other investors using the system for real time matching and execution and wherein buy and sell orders are executed on a price/time priority basis among internal investors;

second storage means coupled to said controller means for collecting and storing data for each investor portfolio concerning that particular portfolio and for storing buy and sell orders on behalf of that particular portfolio;

investor computer means for maintaining each investor portfolio wherein said investor computer means is coupled to said second storage means for analyzing data concerning the portfolio of that particular investor and for generating buy and sell orders for transmission to said second storage means on behalf of that portfolio in order to retain the portfolio objectives while also providing liquidity ot the securities market;

third storage means coupled to said controller means for collecting and storing data concerning the portfolios of all investors using the system;

supervisory computer means coupled to said third storage means for supervising and ensuring the proper functioning of the system;

external data terminal means coupled to said controller means for linking said controller means to external automated securities brokers and exchanges, for transmitting transaction data to external automated securities brokers and exchanges and for transmitting orders remaining unexecuted after first being presented internally to other investors using the system to external automated securities brokers and exchanges for matching and execution in a substantially real time environment;

trade data terminal means coupled to said controller means for reporting all executed sales internal to the system to a central reporting house; and settlement data terminal means coupled to said controller means for reporting all trades involving individual securities for settlement purposes to an external organization.

2. The system of claim 1, further comprising means for consolidating multiple transactions in identical securities within a single day for any particular investor and for assigning a single average price to all buy transactions of that particular investor for each such security and for assigning a single average price to all sell transactions of that particular investor for each such security.

3. The system of claim 1, wherein the portfolio objectives of any particular investor portfolio may be altered at will by that particular investor.

4. In the system of claim 1, means for submitting buy and sell orders for securities to external automated securities brokers and exchanges for execution on a price/probability basis.

5. The system of claim 1, wherein buy and sell orders completed by said controller means include initiation means, execution means, alteration means and cancellation means which perform the respective functions.

6. The system of claim 5, wherein said investor computer means sorts and displays orders of each investor according to criteria established by that investor.

7. The system of claim 6, wherein said investor computer means continuously analyzes and displays on command the trading decisions of each investor in relationship to the portfolio objectives of that investor and interaction of those decisions with the market and other participants in the market.

8. The system of claim 1, wherein said investor computer means instructs said controller means which securities to buy and sell.

9. The system of claim 1, further comprising automatic substitute order means for automatically determining when a transaction other than that specified by said controller means will satisfy the portfolio objectives of a particular investor.

10. A method, performed by a computer system including at least three storage devices maintaining multiple databases, a supervisory computer, a controller, and at least three data terminals, for managing a plurality of internally linked investor portfolios, each having an inventory including numerous and diverse securities traded in securities markets at varying prices which fluctuate upwards and downwards and each having separate portfolio objectives represented by a specified desired mix of investments in securities and cash reserves comprising the computer-performed steps of:

updating data files maintained in a mass storage device connected to a controller central processing unit on a daily basis to reflect corporate actions relating to all managed securities;

updating data files maintained in a mass storage device connected to an investor central processing unit on an ongoing basis with current market information concerning the variance of the price fluctuations of each managed security;

updating data files maintained in a mass storage device connected to an investor central processing unit on an ongoing basis with current market information concerning the normal price of each managed security;

analyzing and altering the desired mix of investments in securities and cash reserves for each investor based on changes in portfolio objectives and according to algorithms customized for each investor as implemented by a central processing unit;

analyzing said variance data, said normal price data and said portfolio objectives according to algorithms developed and maintained within a central processing unit;

generating one or more sets of buy and/or sell orders for securities at specific prices by a controller central processing unit;

offering all buy and sell orders first through internal client investor central processing units to other internally linked investors for real time matching and execution;

electronically executing the buy and sell orders which have been first offered to other internally linked investors;

offering any buy and sell orders remaining unexecuted after having been offered to said other internally linked institutional investors through external central processing units to external automated traders for substantially real time matching and execution; and electronically executing the buy and sell orders which have been offered to external automated traders.

11. The method of claim 10, further comprising the step, after said step of generating, of determining what other transaction(s), might be automatically substituted by a controller central processing unit for any particular buy and/or sell order which would similarly satisfy the portfolio objectives without causing a significant change in the specified desired mix of investments in securities and cash reserves of the portfolio.

12. An on-line interactive event-driven investment processing system for providing added liquidity to continuous auction markets for investment securities and for managing in a real-time environment the interaction of one or more large portfolios of investment securities with each other and with the securities markets, wherein each portfolio has an inventory including numerous and diverse securities and each portfolio has separate portfolio objectives represented by a specified desired mix of investments in securities and cash reserves through generation of trading decisions in the form of buy and sell orders on behalf of each of those portfolios comprising:

first mass storage means within a central processing unit for collecting and storing securities transaction data and price quotation data both from a plurality of securities markets external to the system and from buy and sell orders and transactions generated internal to the system;

controller means for accessing data stored in said first storage means, for analyzing the data stored in said first storage means and for substantially simultaneously transacting multiple purchases and sales of a plurality of securities for one or more of the investor portfolios;

second mass storage means coupled to said controller means for collecting and storing data for each investor portfolio concerning that particular portfolio and for storing buy and sell orders on behalf of that particular portfolio;

investor computer means for maintaining each investor portfolio wherein said investor computer means is coupled to said second storage means for analyzing data concerning the portfolio of that particular investor and for generating buy and sell orders for transmission to said second storage means on behalf of that portfolio in order to retain the portfolio objectives while also providing liquidity to the securities market;

third mass storage means coupled to said controller means for collecting and storing data concerning the portfolios of all investors using the system;

supervisory computer means coupled to said third storage means for supervising and ensuring the proper functioning of the system;

external data terminal means coupled to said controller means for linking said controller means to external automated securities brokers and exchanges and for transmitting orders and transaction data to external automated securities brokers and exchanges;

trade data terminal means coupled to said controller means for reporting all executed sales internal to the system to a central reporting house; and settlement data terminal means coupled to said controller means for reporting all trades involving individual securities for settlement purposes to an external organization.

13. The system of claim 12, wherein said controller means presents orders representing such transactions both to other investors using the system and to external automated securities brokers and exchanges.

14. The system of claim 13, wherein all buy and sell orders for securities are presented first only internally to other investors using the system for real time matching and execution and, if unexecuted, are thereafter presented to external automated securities brokers and exchanges through said external data terminal means for matching and execution in a substantially real time environment.

15. The system of claim 14, wherein buy and sell orders for securities are executed on a price/time priority basis among internal investors.

16. The system of claim 15, wherein buy and sell orders for securities are submitted to external automated securities brokers and exchanges for execution on a price/probability basis.

* * * * *